No. 701,111. Patented May 27, 1902.
W. L. WALL & L. PROPERT.
EYEGLASSES OR SPECTACLES.
(Application filed July 25, 1901.)
(No Model.)
Fig. 1.
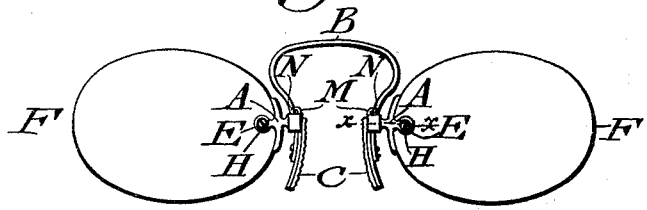
Fig. 2.
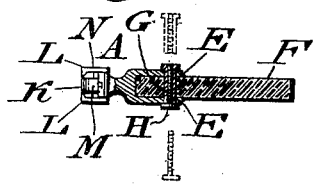
Fig. 5.    Fig. 3.    Fig. 6.
 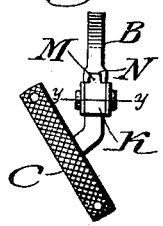 
Fig. 4.
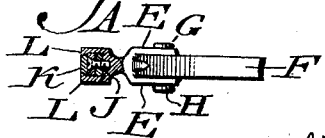
Witnesses
P. F. Nagle.
L. Douville.
Inventors
William L. Wall
Llewellyn Propert
By Diebersheim & Fairbank
Attorneys
THE NORRIS PETERS CO., PHOTO-LITHO., WASHINGTON, D. C.

UNITED STATES PATENT OFFICE.

WILLIAM L. WALL AND LLEWELLYN PROPERT, OF PHILADELPHIA, PENNSYLVANIA, ASSIGNORS TO WALL AND OCHS, OF PHILADELPHIA, PENNSYLVANIA, A FIRM.

EYEGLASSES OR SPECTACLES.

SPECIFICATION forming part of Letters Patent No. 701,111, dated May 27, 1902.

Application filed July 25, 1901. Serial No. 69,610. (No model.)

*To all whom it may concern:*

Be it known that we, WILLIAM L. WALL and LLEWELLYN PROPERT, citizens of the United States, residing in the city and county of Philadelphia, State of Pennsylvania, have invented a new and useful Improvement in Fastenings for Eyeglasses or Spectacles, of which the following is a specification.

Our invention relates to improvements in eyeglasses and spectacles; and it consists of novel means for fastening the lenses with the studs thereof, whereby the lenses may be firmly connected in position and strain materially removed therefrom.

It further consists of a novel means for covering and concealing the head of the screw which connects the nosepiece or bridge, or both, with their supporting-stud.

Figure 1 represents a front view of an eyeglass having our invention applied thereto. Fig. 2 represents a horizontal section on line $x\,x$, Fig. 1, on an enlarged scale. Fig. 3 represents an end elevation taken from within the bridge. Fig. 4 represents a horizontal section on line $y\,y$, Fig. 3. Figs. 5 and 6 represent views of detached portions.

Similar letters of reference indicate corresponding parts in the figures.

Referring to the drawings, A designates the studs of a pair of eyeglasses, B the bridge, and C the nosepieces thereof. E designates the straps of said studs, the same having openings through which are passed the devices by which the lenses F are connected therewith, said devices consisting of two-part screws, each formed of screws G and H, the screw G being internally threaded and serving as a sleeve and receiving the screw H, which is externally threaded, said parts thus being fitted to each other telescopically and each having a head, the head of the tubular screw G when the screws are tightened bearing against one of the straps E and the head of the screw H bearing against the adjacent end of said tubular screw and surrounding portion of the other strap, it being seen that the screw G passes through both straps and an opening in said lenses, and when said screws are tightened the lenses are firmly retained in position by the straps, the strain being exerted in the main by the head of the screw H on the inner end of the screw G, while the heads of both screws bear against the opposite straps, thus relieving the lenses of severe pressure and strain and preventing fracture or breakage thereof. The screw G also fully occupies the opening in the lens, thus preventing side motions of the lens and loosening of the screw, it being noticed that when the article is in use as the tubular screw freely or loosely occupies both straps of the stud it is permitted to rotate therein, and the screw H may turn with it without necessarily in either case causing the unscrewing and loosening of said screw H.

J designates the screws, which in the present case connect the nosepieces and bridge with the studs A; but, as is evident, said screws may connect either said nosepieces or said bridge with said studs. Covering the heads of said screws J are plates or slides K, whose sides are freely fitted in overhanging pieces L, which project inwardly from the straps E, forming ways in which said plates are mounted, whereby said plates may be raised and removed, thus uncovering the heads of said screws, said plates, however, when reapplied and lowered into operative position covering said heads, thus preventing loosening of the screws and presenting a smooth, comfortable, and comparatively flat surface to the sides of the nose of the wearer, it being seen that the plates are supported on the studs independently of the screws J. The contact-faces of the side edges of the plates and of the pieces L may be inclined, forming somewhat wedge-joints, which limit the descent of said shutters.

M designates lips, which project laterally from the upper ends of the plates and are adapted to enter recesses N in the lower ends of the bridge B, thus locking the plates and preventing displacement of the same. When, however, upward pressure is applied to said plates, the lips M, which are somewhat elastic in their nature, are overcome, and thus they leave the recesses N, when the plates may be readily removed.

Having thus described our invention, what we claim as new, and desire to secure by Letters Patent, is—

1. In an eyeglass or spectacle fastening, means for fastening the lens with a carrying-stud, the same consisting of a two-part screw formed of telescopically-fitted members, the exterior member being tubular and loose in both straps of said stud, the head of one member of the screw bearing against the adjacent strap and the head of the other member of said screw bearing against the end of the first-named member, and the surrounding portion of the adjacent strap.

2. In a fastening for an eyeglass or spectacle lens, a stud provided with straps having openings therein, and a two-part screw, the members of which are fitted to each other telescopically, the external member passing freely through both straps and said lens, the head of one member of said screw bearing against the adjacent strap and the head of the other member thereof bearing against the end of the first-named member and the surrounding portion of the adjacent strap.

3. In a fastening for an eyeglass or spectacle lens, a stud provided with straps, each having an opening therein, a two-part screw formed of members fitted to each other telescopically, the outer member of said screw being tubular and passing freely through the openings of both straps and having its head bearing against the adjacent strap and the head of the other member bearing against the end of said tubular member in the opposite strap.

4. In an eyeglass or spectacle fastening, a stud provided with a screw for securing a bridge and nosepiece, and means on said stud for covering the head of said screw, said means consisting of a movable plate which is sustained on said stud independently of said screw.

5. In an eyeglass or spectacle fastening, a stud provided with a screw for securing a bridge and nosepiece, and means on said stud for covering the head of said screw, said means consisting of a movable plate which is sustained on said stud independently of said screw and a locking device on said plate adapted to engage an adjacent part of said stud.

6. In an eyeglass or spectacle, a stud provided with a screw for securing a bridge and nosepiece, and means on said stud for covering the head of said screw, said means consisting of a plate which is movably fitted to said stud, and a locking device for said plate, said device consisting of a lip which is connected with said plate and adapted to engage with an adjacent member of the eyeglass or spectacle.

7. In a fastening for frame and lens of glasses, the combination with the lens and arms adapted to be on opposite sides of the lens, said lens and arms having registering holes, of a separable sleeve passing through the hole in one arm and the lens, and a securing member passing through the sleeve and binding the arms upon the lens.

8. In a fastening for frame and lens of glasses, the combination with the lens and arms adapted to lie on opposite sides of the lens, of a separable sleeve passing through one arm and the lens, and a screw passing through said sleeve and engaging the two arms to bind them upon the lens.

WILLIAM L. WALL.
LLEWELLYN PROPERT.

Witnesses:
JOHN A. WIEDERSHEIM,
C. D. McVAY.